US012752874B2

(12) United States Patent
Rosellini et al.

(10) Patent No.: US 12,752,874 B2
(45) Date of Patent: Oct. 6, 2026

(54) TILTING SADDLE MOTOR VEHICLE WITH LIGHTENED ROLLING FOUR-BAR LINKAGE

(71) Applicant: PIAGGIO & C. S.P.A., Pontedera (IT)

(72) Inventors: Walter Rosellini, Pontedera (IT); Jacopo Roncoroni, Pontedera (IT); Emanuele Savino, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 225 days.

(21) Appl. No.: 18/836,426

(22) PCT Filed: Feb. 7, 2023

(86) PCT No.: PCT/IB2023/051065

§ 371 (c)(1),
(2) Date: Aug. 7, 2024

(87) PCT Pub. No.: WO2023/152627

PCT Pub. Date: Aug. 17, 2023

(65) Prior Publication Data

US 2025/0171103 A1 May 29, 2025

(30) Foreign Application Priority Data

Feb. 8, 2022 (IT) ........................ 102022000002204

(51) Int. Cl.
*B62K 5/08* (2006.01)

(52) U.S. Cl.
CPC ..................................... *B62K 5/08* (2013.01)

(58) Field of Classification Search
CPC ............ B62K 5/027; B62K 5/08; B62K 5/10
See application file for complete search history.

(56) References Cited

U.S. PATENT DOCUMENTS

| | | | | |
|---|---|---|---|---|
| 2013/0168944 A1* | 7/2013 | Bartolozzi | B62K 5/05 | 280/269 |
| 2015/0246704 A1* | 9/2015 | Takano | B60G 3/01 | 280/269 |
| 2015/0314827 A1* | 11/2015 | Takano | B62K 5/08 | 280/267 |
| 2016/0185413 A1* | 6/2016 | Takano | B62K 5/027 | 280/124.103 |
| 2017/0144719 A1* | 5/2017 | Terada | B62K 5/05 | |

(Continued)

FOREIGN PATENT DOCUMENTS

| | | |
|---|---|---|
| EP | 3069977 B1 | 9/2017 |
| EP | 3459832 A1 | 3/2019 |

(Continued)

*Primary Examiner* — Christopher B Wehrly
(74) *Attorney, Agent, or Firm* — McGlew and Tuttle, P.C.

(57) ABSTRACT

A tilting motor vehicle having a pair of steering front wheels (17A, 17B), linked to the frame (3) of the motor vehicle (1) through a rolling four-bar linkage (21). The rolling four-bar linkage comprises an upper crosspiece (23) and a lower crosspiece (25) linked to each other by uprights (27A, 27B) forming the rocker arms of the four-bar linkage. One of the two crosspieces consists of a front half-crosspiece and a rear half-crosspiece, both hinged to the two uprights. The other half-crosspiece having two half-crosspieces, only one of which is hinged at the ends thereof to the two uprights, while the other half-crosspiece is shorter, and it is not hinged to the uprights.

9 Claims, 4 Drawing Sheets

(56) References Cited

U.S. PATENT DOCUMENTS

| | | | | |
|---|---|---|---|---|
| 2018/0327044 | A1* | 11/2018 | Raffaelli | B62K 5/10 |
| 2019/0118598 | A1* | 4/2019 | Sasaki | B62D 25/16 |
| 2021/0284272 | A1* | 9/2021 | Kurakake | B62J 25/06 |

FOREIGN PATENT DOCUMENTS

| | | | |
|---|---|---|---|
| EP | 3476705 | A1 | 5/2019 |
| WO | 2020084402 | A1 | 4/2020 |

* cited by examiner

TILTING SADDLE MOTOR VEHICLE WITH LIGHTENED ROLLING FOUR-BAR LINKAGE

TECHNICAL FIELD

The present invention relates to the field of the so-called rolling or tilting motor vehicles, i.e. provided with a rolling motion about a median plane which extends longitudinally along the vehicle. Embodiments disclosed herein relate to saddled vehicles with three or more wheels, in particular with two steered front wheels and at least one rear drive wheel.

BACKGROUND ART

In the field of motor vehicles there is a growing offer for vehicles which combine the characteristics of the two-wheeled saddle-ride-type vehicles (motorcycles and mopeds, for example) in terms of ease of manoeuvre, with the stability of four-wheeled vehicles. These vehicles include three-wheeled motor vehicles provided with two front steered wheels and with a rear drive wheel, and four-wheeled motor vehicles, typically referred to as QUAD.

In greater detail, the aforementioned three-wheeled motor vehicles are provided with front two steered wheels, that is configured to steer the vehicle controlled by means of the handlebar by the rider, and rolling, that is tilting or inclinable laterally with a rolling motion. The rolling motion is a pivoting motion about an axis substantially oriented in the direction of travel. Furthermore, the three-wheeled vehicles comprise a rear drive wheel, drivingly connected to the engine and having the purpose of supplying the drive torque and therefore allowing traction, while the paired front wheels have the purpose of providing the directionality of the vehicle.

Besides the steering movement, the paired front wheels are provided with a rolling motion and they are connected to the frame of the vehicle through shock absorbing suspensions, which allow a spring suspension movement. Thanks to the use of two paired front wheels, with respect to a motor vehicle with only two wheels, a rolling vehicle has a greater stability ensured by the double support of the front wheels on the ground, similarly to the one offered by a car.

The front wheels are connected to each other by means of kinematic mechanisms which ensure that the wheels substantially roll and steer in a synchronous manner, for example by interposing one or two four-bar linkages which link the front wheels to a forecarriage frame. These four-bar linkages will also be referred to hereinafter as "rolling four-bar linkages". Furthermore, the motor vehicles taken into account herein are frequently provided with two independent shock absorbing suspensions, one for each front drive wheel. Each suspension is provided with an elastic element (spring) and a viscous element (shock absorber).

The four-bar linkage which links the front steered wheels to the frame should have a high mechanical strength to bear the dynamic loads to which it is subjected. The rolling four-bar linkage must therefore be suitably sized, and it is a cumbersome and heavy component of the motor vehicle, which negatively and significantly affects the cost of the vehicle and the ease of manoeuvre thereof.

It would be advantageous to provide a saddle-riding type rolling motor vehicle provided with a rolling four-bar linkage which fully or partly overcomes the drawbacks of the prior art. In particular, it would be advantageous to provide a vehicle with a rolling four-bar linkage that is lighter and easier to manoeuvre, more cost-effective but with sufficient mechanical strength.

SUMMARY OF THE INVENTION

Basically, disclosed herein is a tilting motor vehicle, comprising a pair of front steered wheels, connected to the frame of the motor vehicle through a rolling four-bar linkage. The rolling four-bar linkage comprises an upper crosspiece and a lower crosspiece linked to each other by uprights forming the rocker arms of the four-bar linkage. One of the two crosspieces, preferably the lower one, consists of a front half-crosspiece and a rear half-crosspiece, both hinged to the two uprights. The other half-crosspiece, preferably the lower one, comprises two half-crosspieces, only one of which (preferably the front one) is hinged (at the ends thereof) to the two uprights, while the other half-crosspiece (preferably the lower one) is shorter, and it is not hinged to the uprights.

In an embodiment disclosed herein, there is particularly provided for a tilting or rolling saddle-ride type motor vehicle, comprising a rolling four-bar linkage having an upper crosspiece, hinged at an intermediate point thereof to a central element of the frame; wherein the upper crosspiece comprises a front half-crosspiece arranged in front of the central element of the frame and a rear half-crosspiece arranged behind the central element of the frame. The front half-crosspiece and the rear half-crosspiece form a single rigid body, through which the central element of the frame extends. The rolling four-bar linkage further comprises a lower crosspiece, hinged at an intermediate point thereof to the central element of the frame; wherein the lower crosspiece comprises a front half-crosspiece arranged in front of the central element of the frame and a rear half-crosspiece arranged behind the central element of the frame. The front half-crosspiece and the rear half-crosspiece form a single rigid body, through which the central element of the frame extends. The rolling four-bar linkage also comprises a left upright hinged to a left end of the upper crosspiece and to a left end of the lower crosspiece. The left steered wheel is linked to the left upright so as to rotate about a left steering axis. Furthermore, the rolling four-bar linkage comprises a right upright hinged to a right end of the upper crosspiece and to a right end of the lower crosspiece. The right steered wheel is linked to the right upright so as to rotate about a right steering axis.

Characteristically, in order to reduce the weight and cost of the rolling four-bar linkage, while at the same time maintaining an appropriate robustness and increasing the ease of manoeuvre of the motor vehicle, in embodiments described herein, for one of the two crosspieces (respectively upper and lower), one of the front and rear half-crosspieces has a length greater than that of the other half-crosspiece. The longer half-crosspiece is directly hinged to the left upright and to the right upright through respective left and right hinges. The other shorter half-crosspiece is not directly hinged to the left upright and to the right upright.

Vice versa, both the front half-crosspiece and the rear half-crosspiece of the other of said upper crosspiece and lower crosspiece are directly hinged both to the left upright through left hinges and to the right upright through right hinges.

Basically, one of the two crosspieces consists of a half-crosspiece which contributes to the rigidity of the crosspiece, but it is not hinged to the uprights of the four-bar linkage. In this manner, although maintaining an appropriate mechanical strength and rigidity of the system formed by the four-bar linkage, its weight and cost are reduced compared to the four-bar linkages, which have two crosspieces, each comprising a front half-crosspiece and a rear half-crosspiece both hinged with respective hinges to the uprights.

Preferably, for the reasons which will be clarified hereinafter, the shorter half-crosspiece belongs to the upper crosspiece, and it is preferably the rear half-crosspiece.

Unless indicated otherwise, in the present description and in the attached claims, the expressions “above”, “below”, “in front”, “behind”, “right”, “left”, “upper”, “lower”, “front” and “rear” refer to positions of respective members or components when the motor vehicle is in a straight, non-steered and non-rolled position. The expressions “front” and “rear” refer to the forward direction of travel of the motor vehicle.

The indications “right” and “left” refer to the rider of the vehicle who is in the correct riding position, seated on the saddle of the motor vehicle facing forward with respect to the normal advancement direction of the motor vehicle.

BRIEF DESCRIPTION OF THE DRAWINGS

The invention will be clearer from the description and the attached drawings, which illustrate an embodiment provided by way of non-limiting example of the invention. More particularly, in the drawings.

DETAILED DESCRIPTION

Figure 1:
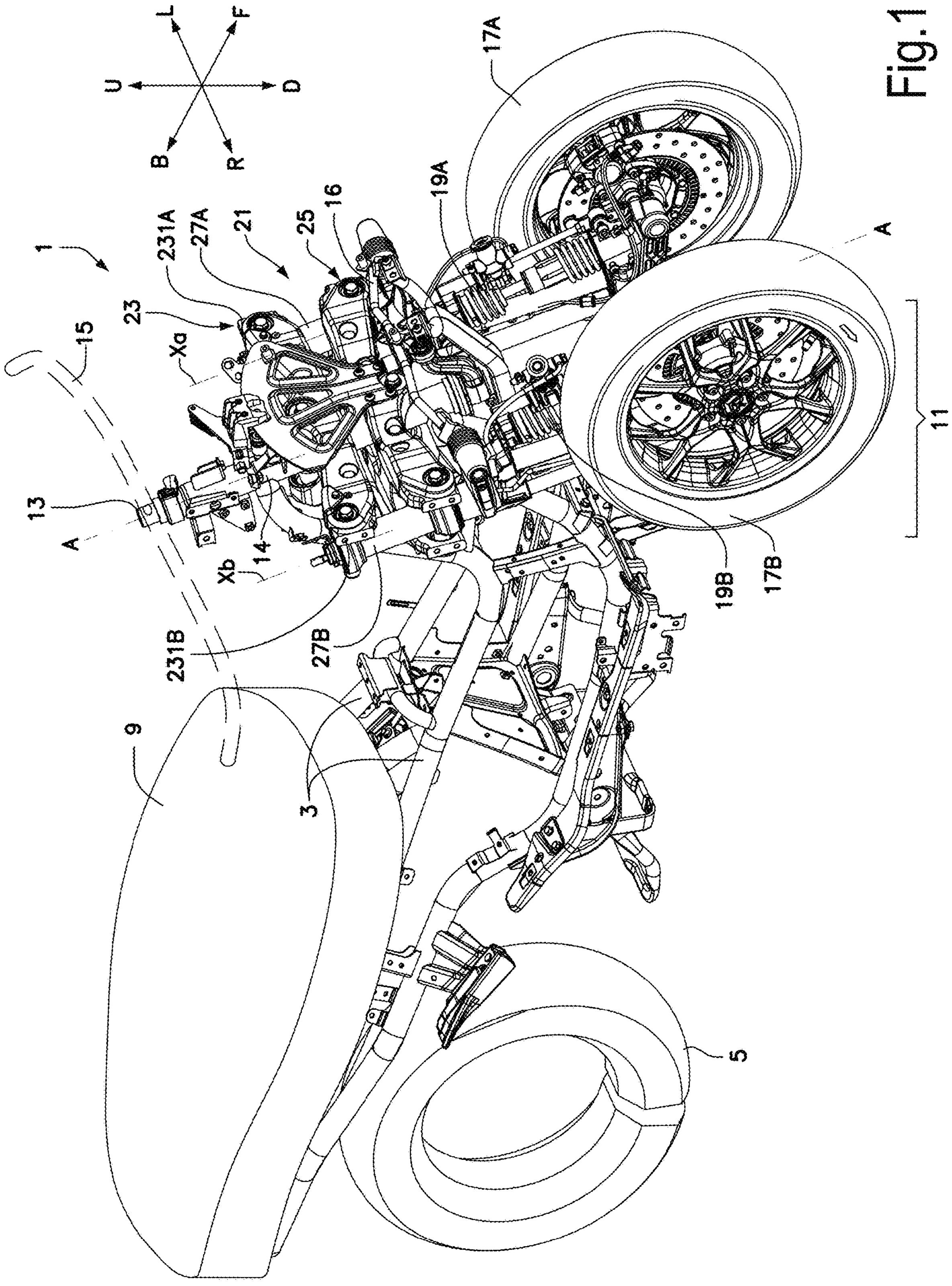
FIG. 1 is an axonometric view of a motor vehicle with parts removed.

FIG. 1 shows a motor vehicle 1 according to an embodiment in axonometric view. In FIG. 1 and in the other figures, the arrow U shows the upward direction, the arrow D shows the downward direction, the arrows L and R show the left and right direction respectively. Lastly, F and B respectively show the forward direction (direction of travel) and the backward direction.

The motor vehicle 1 comprises a frame 3, to which a rear drive wheel 5 is connected. The drive wheel is connected to an engine, not shown. A saddle of the motor vehicle 1 is schematically shown at 9. In the representation of FIG. 1 the panels of the body of the motor vehicle, the engine and the relative drive members as well as anything else not useful to the intelligibility of the present invention, are omitted.

In other embodiments, not shown, the motor vehicle 1 may comprise two rear drive wheels, instead of a single drive wheel.

At the front part, the motor vehicle 1 comprises a forecarriage 11, which comprises a handle bar, a pair of steered front wheels and a mechanism which connected the steered front wheels, as well as their suspensions, to the frame 3 so as to allow the motor vehicle to perform rolling motions, i.e. a pivoting movement about a horizontal axis, parallel to the direction of travel and lying on the ground, i.e on the surface on which the motor vehicle rests.

More particularly, the forecarriage 11 comprises a steering column 13 to which a handlebar, schematically shown with a dashed line at 15, is linked. The steering column 13 is rotatably received in a steering tube 14 integrally connected to the frame 3 or part thereof. Using the steering column 13, the rider transmits a steering movement to the two front steered wheels and more precisely a left front steered wheel 17A and a right front steered wheel 17B. The steering movement is transmitted to the front steered wheels 17A, 17B through a steering bar 16.

A shock absorbing device, generally comprising an elastic component and a viscous component, is associated with each front steered wheel 17A, 17B. More precisely, a left shock absorbing device, associated with the left front steered wheel 17A is indicated with 19A, and a right shock absorbing device, associated with the right front steered wheel 17B is indicated with 19B.

Figure 2:
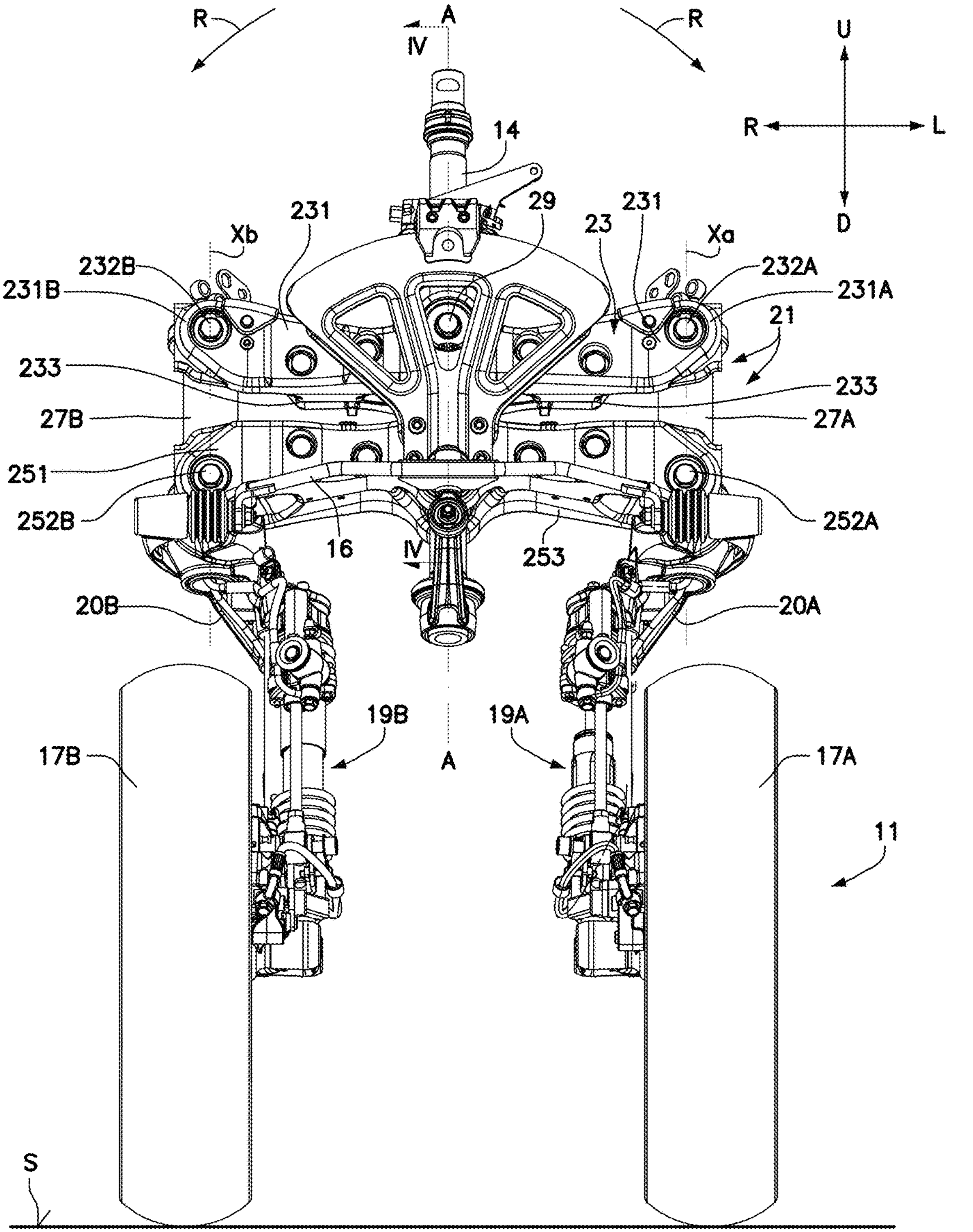
FIG. 2 is a front view of the front steered wheels, of the suspensions and of the rolling four-bar linkage.

The front steered wheels 17A, 17B and the relative shock absorbing devices 19A, 19B are connected to the frame 3 so as to allow the front steered wheels 17A, 17B to rotatably move (steering) about respective steering axes indicated with Xa for the left front steered wheel 17A and with Xb for the right front steered wheel 17B. Furthermore, the linkage of the front steered wheels 17A, 17B to the frame 3 is configured so as to allow the motor vehicle 1 to perform rolling motions, i.e. for inclination about a horizontal axis passing through the support surface of the motor vehicle (indicated with S in FIG. 2) for example when the motor vehicle drives round a curve. The rolling motion is schematically shown by the double arrow R in FIG. 2.

In order to allow these movements, the forecarriage 11 of the motor vehicle 1 comprises a rolling four-bar linkage 21, which forms a mechanical linkage component between the front steered wheels 17A, 17B and the frame 3.

The rolling four-bar linkage 21, hereinafter briefly referred to as four-bar linkage 21, comprises an upper crosspiece 23 and a lower crosspiece 25 linked to the frame 3 as described herein. The four-bar linkage 21 further comprises a left upright 27A and a right upright 27B, which form the rocker arms of the four-bar linkage 21 and are hinged as described herein to the upper crosspiece 23 and to the lower crosspiece 25. In the shown embodiment, the left front steered wheel 17A and the left shock absorbing device 19A are linked to the four-bar linkage 21 through a left arm 20A rotatably housed in the left upright 27A, so as to rotate about the left steering axis Xa. Similarly, the right front steered wheel 17B and the right shock absorbing device 19B are linked to the four-bar linkage 21 through a right arm 20B rotatably housed in the right upright 27B, so as to rotate about the right steering axis Xb.

Figure 4:
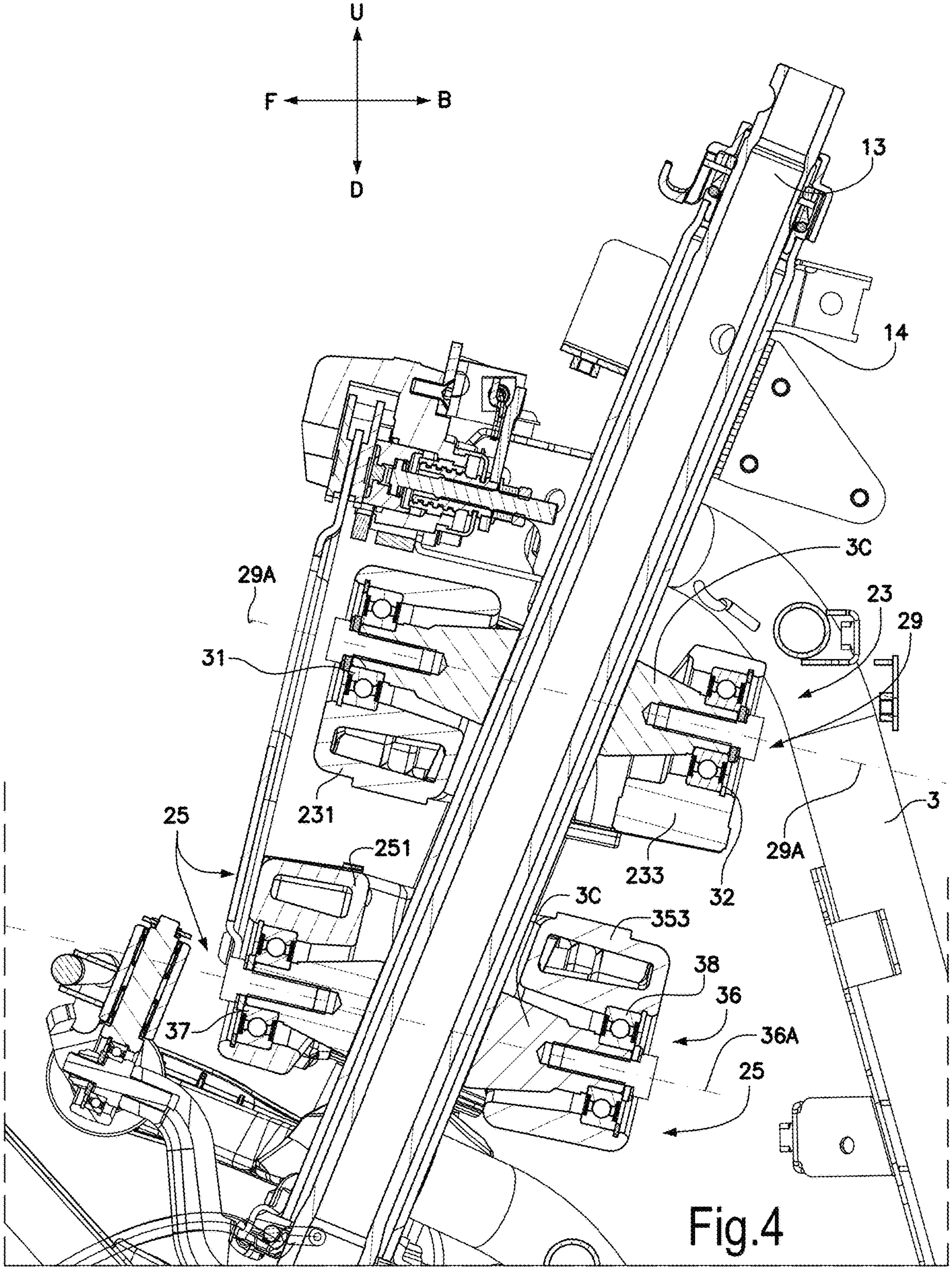
FIG. 4 is a second cross-section according to a vertical median plane of the steering tube and of the upper crosspiece of the rolling four-bar linkage, according to the plane IV-IV of FIG. 2.

The upper crosspiece 23 is hinged at an intermediate point of the longitudinal extension thereof to a central element 3C (see. FIG. 4) of the frame 3, for example to the steering tube 14 or an element integrally connected therewith. The intermediate hinge point of the upper crosspiece 23 is labelled 29. Basically, the hinge point 29 defines a central hinge axis 29A about which the upper crosspiece 23 rotates with respect to the frame 3. The central hinge axis 29A lies in a vertical median plane of the vehicle, whose line coincides with the axis A-A of FIG. 2. The hinge axis 29A extends in the direction of the median plane and it is inclined from top to bottom in the direction of the arrow B, opposite to the forward direction of travel (arrow F).

In concrete embodiments, the hinge between the central element 3C and the upper crosspiece 23 is defined by two bearings 31 and 32, arranged respectively in front and behind the central element 32C of the frame 3 with respect to the advancement direction of the vehicle, defined by the arrow F.

The upper crosspiece 23 comprises a front half-crosspiece 231 arranged in front of the central element 3C with respect to the advancement direction of the vehicle (arrow F) and a rear half-crosspiece 233, arranged behind the central element 3C of the frame 3. As visible in particular in FIG. 3, the front half-crosspiece 231 is longer than the rear half-crosspiece 233 for the reasons clarified below.

The front half-crosspiece 231 has a left end 231A hinged to the left upright 27A through a left hinge 232A, which may be defined by a bearing. The axis of the left hinge 232A is parallel to the axis 29A of the central hinge which links the upper crosspiece 23 to the frame 3. Furthermore, the front half-crosspiece 231 has a right end 231B hinged to the right upright 27B through a right hinge 232B, which can be defined by a bearing. The axis of the right hinge 232B is parallel to the axis 29A of the central hinge which links the upper crosspiece 23 to the frame 3.

In concrete embodiments, the hinged between the central element 3C and the upper crosspiece 23 is defined by two coaxial bearings 31 and 32, arranged respectively in front and behind the central element 32C of the frame 3 with respect to the advancement direction of the vehicle, defined by the arrow F.

In the shown embodiment, as mentioned above, the rear half-crosspiece 233 is shorter than the front half-crosspiece 231 and therefore the left end 233A thereof and the right end 233B thereof do not extend up to the uprights 27A, 27B and they are not directly linked to the uprights 27A, 27B.

The rear half-crosspiece 233 and the front half-crosspiece 231 are however connected to each other so as to form a single rigid body. In the shown embodiment, the front half-crosspiece 231 and the rear half-crosspiece 233 consist of two mechanical workpieces which are physically distinct and connected by screws or other connection means. However, providing the two half-crosspieces 231 and 233 in a single work-piece, for example a single mechanical component, for example manufactured by casting, or by removing chips from a single block cannot be ruled out.

The lower crosspiece 25 is hinged at an intermediate point 36 of the longitudinal extension thereof to the central element 3C (see. FIG. 4) of the frame 3. Basically, the hinge point 36 defines a central hinge axis 36A about which the lower crosspiece 25 rotates with respect to the frame 3. The central hinge axis 36A lies in the vertical median plane of the vehicle in the same way as the axis 29A. The hinge axis 36 extends in the direction of the median plane and it is inclined from top to bottom in the rear direction (arrow B).

In concrete embodiments, the hinge between the central element 3C and the lower crosspiece 25 is defined by two coaxial bearings 37, 38, arranged respectively in front and behind the central element 3C of the frame 3 with respect to the advancement direction of the vehicle (arrow F).

The lower crosspiece 25 comprises a front half-crosspiece 251 arranged in front of the central element 3C with respect to the advancement direction of the vehicle (arrow F) and a rear half-crosspiece 253 arranged behind the central element 3C.

Figure 3:
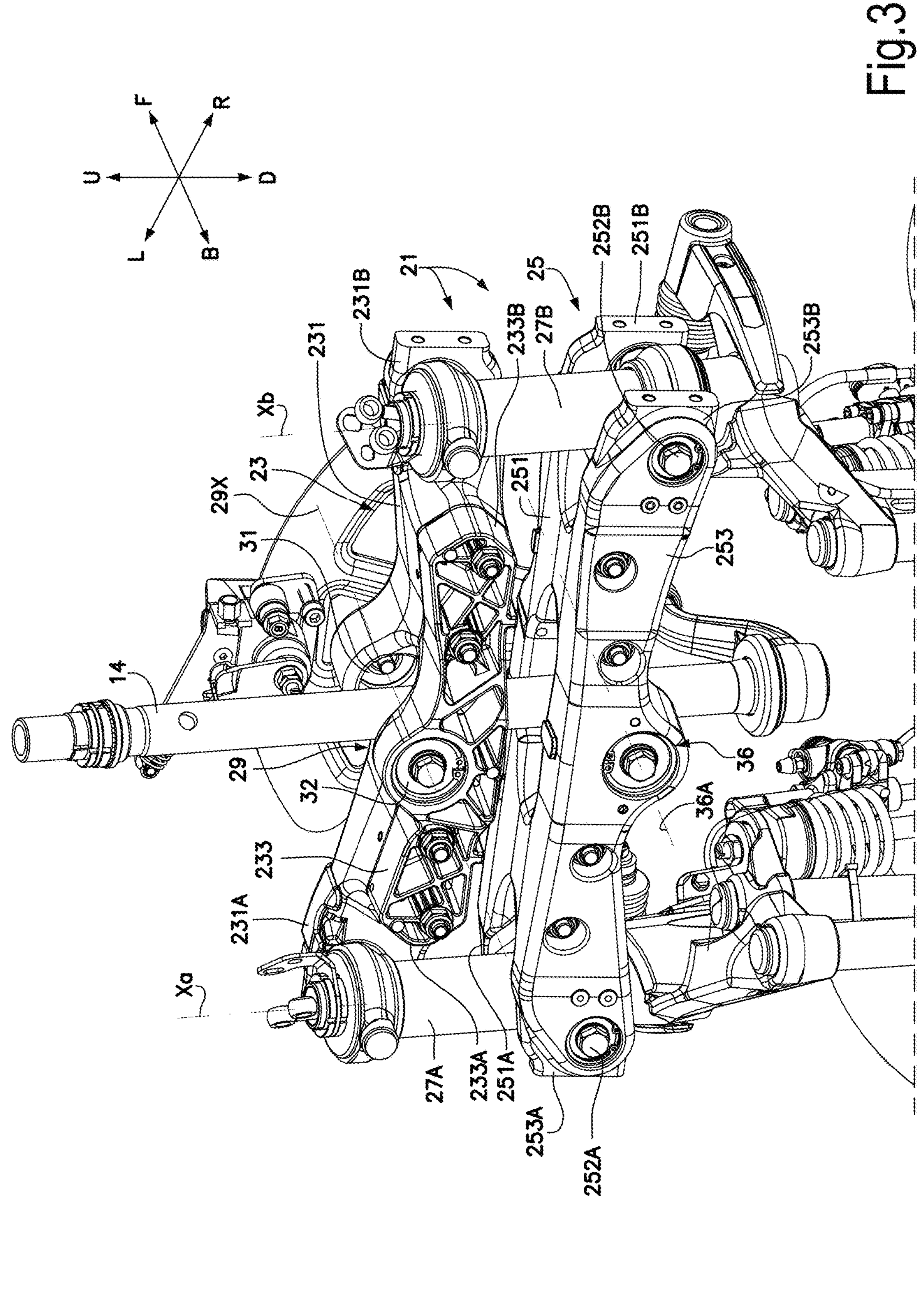
FIG. 3 is an axonometric view of the rolling four-bar linkage on the side of the rider.

As visible in particular in FIG. 3, contrary to the half-crosspieces 231, 233 which form the upper crosspiece 23, the front half-crosspiece 251 and the rear half-crosspiece 253 of the lower crosspiece 25 have the same length, or they are however both sufficiently long to be connected at the ends thereof respectively to the left upright 27A and to the right upright 27B of the four-bar linkage 21. Each half-crosspiece is hinged to the respective uprights with respective hinges, each for example consisting of a bearing, so that the linkage between the lower crosspiece 25 and uprights 27A, 27B requires four bearings, while the linkage between the upper crosspiece 23 and the uprights 27A, 27B requires only two bearings.

More particularly, the front half-crosspiece 251 has a left end 251A hinged to the left upright 27A through a left hinge 252A defined by a respective bearing and the axis whereof is parallel to the axis 36A of the central hinge which links the lower crosspiece 25 to the frame 3. Furthermore, the front half-crosspiece 251 has a right end 251B hinged to the right upright 27B through a right hinge 252B defined by a respective bearing and the axis whereof is parallel to the axis 36A of the central hinge which links the lower crosspiece 25 to the frame 3.

In the shown embodiment, as mentioned above, the rear half-crosspiece 253 has the same length as the front half-crosspiece 251 and therefore the left and right ends thereof, shown at 253A and 253B, are directly hinged to the uprights 27A, 27B at the hinges 252A and 252B through respective hinges defined by respective bearings, similarly to those that define the hinges between the uprights 27A, 27B and the front half-crosspiece 251.

In this case, the two right and left ends thereof of the lower crosspiece 25 are therefore hinged to the uprights 27A, 27*b* through respective double right 252B and left 252A hinges. Each double hinge consists of a pair of bearings, the first housed in the end of the front half-crosspiece 251 and the second, coaxial to the first, housed in the end of the rear half-crosspiece 253.

The rear half-crosspiece 253 and the front half-crosspiece 251 are further linked to each other so as to form a rigid body. In the shown embodiment, the front half-crosspiece 231 and the rear half-crosspiece 233 consist of two mechanical work-pieces which are physically distinct and connected by screws or other connection means. However, providing the two half-crosspieces 251 and 253 in a single work-piece, for example a single mechanical component manufactured by casting or by removing chips from a single block cannot be ruled out.

The four-bar linkage structure 21 thus obtained is very resistant and the cross-pieces are very rigid so as not to bend under the stress generated during the travel. However, at the same time the four-bar linkage 21 is lighter and less cumbersome than a four-bar linkage of the prior art. As a matter of fact, the lower crosspiece 25, on which greater stresses than to the upper crosspiece 23 are applied, consists of two half-crosspieces (the front half-crosspieces 251 and the rear half-crosspiece 253, respectively) the length whereof is such that both are mechanically linked through a bearing to the two uprights 27A and 27B of the four-bar linkage 21. The double hinge, i.e. the double bearing between each upright 27A and 27B and the two ends of the lower crosspiece 25 confer high rigidity to the structure.

The upper crosspiece 23, which is subject to lesser stresses, is linked at the two right and left ends to the two uprights 27A e 27B through respective hinges corresponding to only one bearing, given that one of the two half-crosspieces (in particular preferably the rear half-crosspiece 233) is shorter and it does not reach the hinge axis between the upper crosspiece 23 and the uprights 27A, 27B.

This allows obtaining a lightening of the four-bar linkage 21 given that the mass of the upper rear half-crosspiece 233 is smaller and given that two bearings are missing. The decrease in the mass and the decrease in the overall number of bearings in the four-bar linkage articulations also reduce the cost of the four-bar linkage 21.

However, the resistance and rigidity of the components of the four-bar linkage 21 are not jeopardised by this lightening and reduction of components, in particular if the reduction of the bearings and the length of one of the two half-crosspieces regards the upper crosspiece 23, which is subject to less stresses. Even more advantageous, as provided for in the shown example, is the fact that the lightened half-crosspiece is the rear upper one (233), instead of the front upper crosspiece (231).

The invention claimed is:

1. A tilting saddle motor vehicle, comprising:

a frame;

a rear drive wheel;

a front left steered wheel with a left shock absorbing device; and a front right steered wheel with a right shock absorbing device;

a rolling four-bar linkage, comprising:

an upper crosspiece, hinged at an intermediate point to a central element of the frame;

wherein the upper crosspiece comprises a front half-crosspiece arranged in front of the central element of the frame and a rear half-crosspiece arranged behind the central element of the frame; wherein the front half-crosspiece and the rear half-crosspiece form a single rigid body, through which the central element of the frame extends;

a lower crosspiece, hinged at an intermediate point to the central element of the frame; wherein the lower crosspiece comprises a front half-crosspiece arranged in front of the central element of the frame and a rear half-crosspiece arranged behind the central element of the frame; wherein the front half-crosspiece and the rear half-crosspiece form a single rigid body, through which the central element of the frame extends;

a left upright hinged to a left end of the upper crosspiece and to a left end of the lower crosspiece; wherein the left steered wheel is linked to the left upright so as to rotate about a left steering axis;

a right upright hinged to a right end of the upper crosspiece and to a right end of the lower crosspiece; wherein the right steered wheel is linked to the right upright so as to rotate about a right steering axis, wherein:

a first of said front half-crosspiece and rear half-crosspiece of a first of said upper crosspiece and lower crosspiece is longer than a second of said front half-crosspiece and rear half-crosspiece of the first crosspiece, and is directly hinged to the left up-right through a left hinge and to the right upright through a right hinge;

a second of said front half-crosspiece and rear half-crosspiece of said first crosspiece is not directly hinged to the left upright and to the right upright; and both said front half-crosspiece and rear half-crosspiece of a second of said upper crosspiece and lower crosspiece are directly hinged to the left upright through left hinges and to the right upright through right hinges.

2. The motor vehicle of claim 1, wherein the first crosspiece is the upper crosspiece.

3. The motor vehicle of claim 1, wherein the first half-crosspiece of the first crosspiece is the front half-crosspiece.

4. The motor vehicle of claim 1, wherein each hinge linking the upper crosspiece and the lower crosspiece to the left upright and to the right upright comprises a respective bearing.

5. The motor vehicle of claim 1, wherein the front half-crosspiece and the rear half-crosspiece of the first crosspiece consist of a single monobloc workpiece.

6. The motor vehicle of claim 1, wherein the front half-crosspiece and the rear half-crosspiece of the first crosspiece consist of two components rigidly connected to each other through mechanical connection members.

7. The motor vehicle of claim 1, wherein the front half-crosspiece and the rear half-crosspiece of the second crosspiece consist of a single monobloc workpiece.

8. The motor vehicle of claim 1, wherein the front half-crosspiece and the rear half-crosspiece of the second crosspiece consist of two components rigidly connected to each other through mechanical connection members.

9. The motor vehicle of claim 1, wherein each of said first crosspiece and second crosspiece is linked to the central element of the frame through a front bearing constrained to the front half-crosspiece of the respective crosspiece and through a rear bearing constrained to the rear half-crosspiece of the respective crosspiece.

* * * * *